United States Patent
Egi

(10) Patent No.: US 7,231,299 B2
(45) Date of Patent: Jun. 12, 2007

(54) METHOD, PROGRAM, AND SYSTEM FOR ESTIMATING WEATHER RISK

(75) Inventor: Masashi Egi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 142 days.

(21) Appl. No.: 10/900,112

(22) Filed: Jul. 28, 2004

(65) Prior Publication Data

US 2005/0197774 A1 Sep. 8, 2005

(30) Foreign Application Priority Data

Mar. 2, 2004 (JP) ............................ P2004-057314

(51) Int. Cl.
*G01W 1/00* (2006.01)
(52) U.S. Cl. ....................................... 702/3
(58) Field of Classification Search ..................... 702/3
See application file for complete search history.

(56) References Cited

U.S. PATENT DOCUMENTS

2002/0016676 A1 * 2/2002 Sann ............................. 702/3
2004/0064255 A1 * 4/2004 Egi ............................... 702/3

FOREIGN PATENT DOCUMENTS

| JP | 2001-222605 | 8/2001 |
|----|-------------|--------|
| JP | 2003-122918 | 4/2003 |

OTHER PUBLICATIONS

D.S. Wilks, Multisite generalization of a daily stochastic precipitation generation model, 1998, Journal of Hydrology, 210, pp. 178-191.*

R. Caballero et al, "Multivariate Long-Memory Modeling of Daily Surface Air Temperatures and the Valuation of Weather Derivative Portfolios", Jul. 2002, pp. 1-25.

D. Wilks, "Multisite Generalization of Daily Stochastic Precipitation Generation Model", Journal of Hydrology 210, 1998, pp. 178-191.

C. Richardson, "Stochastic Simulation of Daily Precipitation, Temperature, and Solar Radiation", Water Resources Research, Feb. 1981, pp. 182-190.

* cited by examiner

*Primary Examiner*—John Barlow
*Assistant Examiner*—Cindy D. Khuu
(74) *Attorney, Agent, or Firm*—Mattingly, Stanger, Malur & Brundidge, P.C.

(57) ABSTRACT

The amount of risk in weather derivatives is calculated properly by taking into account a correlation between weather observation sites and a correlation between meteorological elements. A weather prediction method by creating a weather scenario from historical weather data includes a first step of estimating parameters of a weather time-series model based on historical weather data including past plural meteorological elements, a meteorological element correlation between sites, and a correlation between meteorological elements, and a second step of converting random numbers into meteorological elements based on the estimated parameters. The second step is executed a given number of times to create a plurality of weather scenarios.

10 Claims, 12 Drawing Sheets

| | | |
|---|---|---|
| SCENARIO CREATION NUMBER | 10,000 | 21 |
| CREATION PERIOD | 6/1~7/20 | 22 |
| CREATION SITE | OSAKA, NAGOYA, TOKYO | 23 |

| DATE | OSAKA | | NAGOYA | | TOKYO | |
|---|---|---|---|---|---|---|
| | TEMPERATURE (°C) | PRECIPITATION (mm) | TEMPERATURE (°C) | PRECIPITATION (mm) | TEMPERATURE (°C) | PRECIPITATION (mm) |
| 6/1 | 24.0 | 0.0 | 24.0 | 0.0 | 25.2 | 0.0 |
| 6/2 | 23.9 | 0.0 | 23.7 | 1.0 | 25.3 | 0.0 |
| ... | ... | ... | ... | ... | ... | ... |
| 7/19 | 27.1 | 1.5 | 27.8 | 0.0 | 26.1 | 1.0 |
| 7/20 | 27.4 | 3.0 | 26.6 | 0.0 | 26.0 | 0.0 |

METHOD, PROGRAM, AND SYSTEM FOR ESTIMATING WEATHER RISK

CLAIM OF PRIORITY

The present application claims priority from Japanese application P2004-057314 filed on Mar. 2, 2004, the content of which is hereby incorporated by reference into this application.

BACKGROUND OF THE INVENTION

This invention relates to a method of estimating weather risks, typically, risks in weather derivatives.

Weather conditions such as temperature, precipitation, and the amount of snow cover significantly affect business activities of a company. For instance, a heat wave in summer boosts sales for air conditioning manufacturers and electric power companies whereas it dents profit of department stores and railway companies by raising cooling cost. To give another example, extraordinarily low precipitation brings more customers or visitors to travel agencies and theme parks whereas it is adverse to electric power companies since their hydraulic power units cannot run efficiently and the cost of alternative power generation increases. Fluctuations in sales or profit due to such weather conditions are called weather risks.

In recent years, financial derivatives called weather derivatives are attracting attention as an instrument to reduce weather risks and ensure a steady profit. A weather derivative is a contract between a business entity subject to weather risks and a property insurance company or the like in which the business entity pays the insurance company contract money first and receives a compensation payment if certain set weather conditions are met in future times. Several methods have been proposed to calculate contract money of a weather derivative (refer to JP 2001-222605 A and JP 2003-122918 A).

Proposed as the basis for calculating contract money of a weather derivative are a weather forecast based on a multi-site temperature model (refer to "Multivariate long memory modeling of daily surface air temperatures and the valuation of weather derivative portfolios", written by Rodrigo Caballero et al., internetURL: http://stephenjewson.com/articles/), a weather forecast based on a multi-site precipitation model (refer to "Multisite generalization of a daily stochastic precipitation generation model", D. S. Wilks, Journal of Hydrology, 1998, 210, pp. 178–191), and a weather forecast based on a single-site precipitation-temperature correlation model (see, for example, Richardson, C. W., "Stochastic simulation of daily precipitation, temperature, and solar radiation", Water Resources Research, 17, pp. 182–190).

A provider of a weather derivative (a property insurance company, a trade firm, or a bank) holds a portfolio of the contract, and needs to calculate the amount of risk and analyze factors about the portfolio. Conventionally, those needs have been taken care of in the following manner. First, a time-series model built for each site or for each meteorological element is used to create a weather scenario. The 99% VaR (Value at Risk) is calculated from the weather scenario created and the sum of the 99% VaR is evaluated as the total amount of risk (FIG. 12).

SUMMARY OF THE INVENTION

The above-mentioned method, which calculates VaR for each individual weather derivative contract, overestimates the total amount of risk since there are significant correlations between weather observation sites and between meteorological elements.

It is therefore an object of this invention to estimate the amount of risk in weather derivatives properly by taking into account a correlation between weather observation sites and a correlation between meteorological elements.

According to a embodiment of this invention, there is provided a method of predicting weather on a computer by creating a weather scenario from historical weather data, including: a first step of estimating parameters of a weather time-series model based on historical weather data including past plural meteorological elements, a meteorological element correlation between sites, and a correlation between meteorological elements; and a second step of converting random numbers into meteorological elements based on the estimated parameters, wherein the method creates a plurality of weather scenarios by executing the second step predetermined times.

According to this invention, the amount of risk in weather derivatives can be estimated properly.

BRIEF DESCRIPTION OF THE DRAWINGS

FIG. 3 is an explanatory diagram of weather scenario creating conditions according to the embodiment of this invention.

FIG. 4 is an explanatory diagram of historical weather data according to the embodiment of this invention.

DETAILED DESCRIPTION OF THE PREFERRED EMBODIMENT

An embodiment of this invention will be described below with reference to the accompanying drawings.

Figure 1:
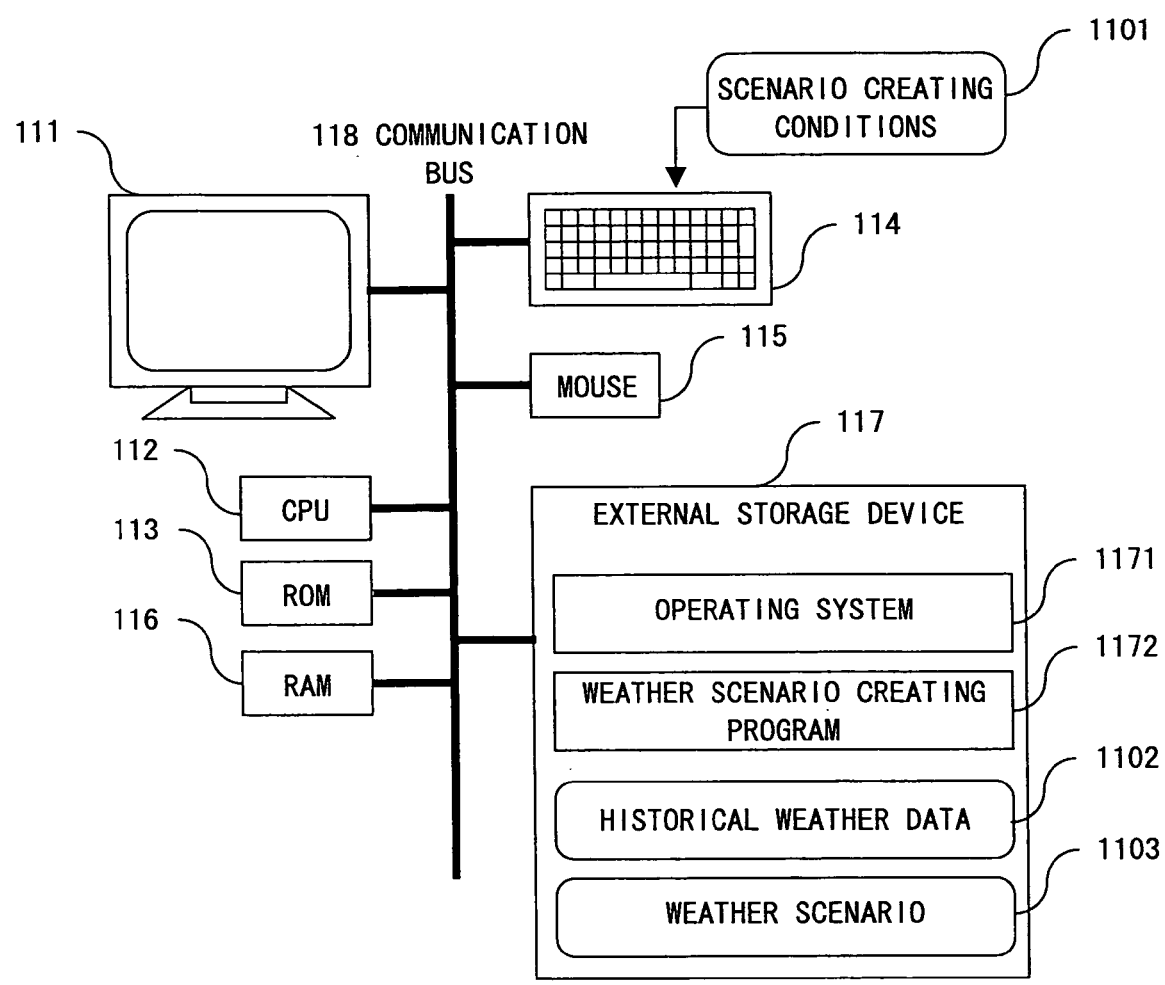
FIG. 1 is a block diagram showing the structure of a prediction device according to an embodiment of this invention.

FIG. 1 is a block diagram showing the structure of a prediction device according to this embodiment.

The prediction device of this embodiment is composed of a display device 111, a CPU 112, a ROM 113, input devices (a keyboard 114 and a mouse 115), a RAM 116, an external storage device (hard disk) 117, and a communication bus 118, which connects the above components to one another.

The external storage device 117 stores an operating system 1171, a weather scenario creating program 1172, and a portfolio calculation program. The CPU 112 calls up these programs to execute various processing. The external storage device 117 also stores historical weather data 1102 and a weather scenario 1103.

In the prediction device of this embodiment, the weather scenario creating program 1172 creates the weather scenario 1103 from scenario creating conditions 1101, which are inputted through the input devices 114 and 115, referring to the historical weather data 1102.

Figure 2:
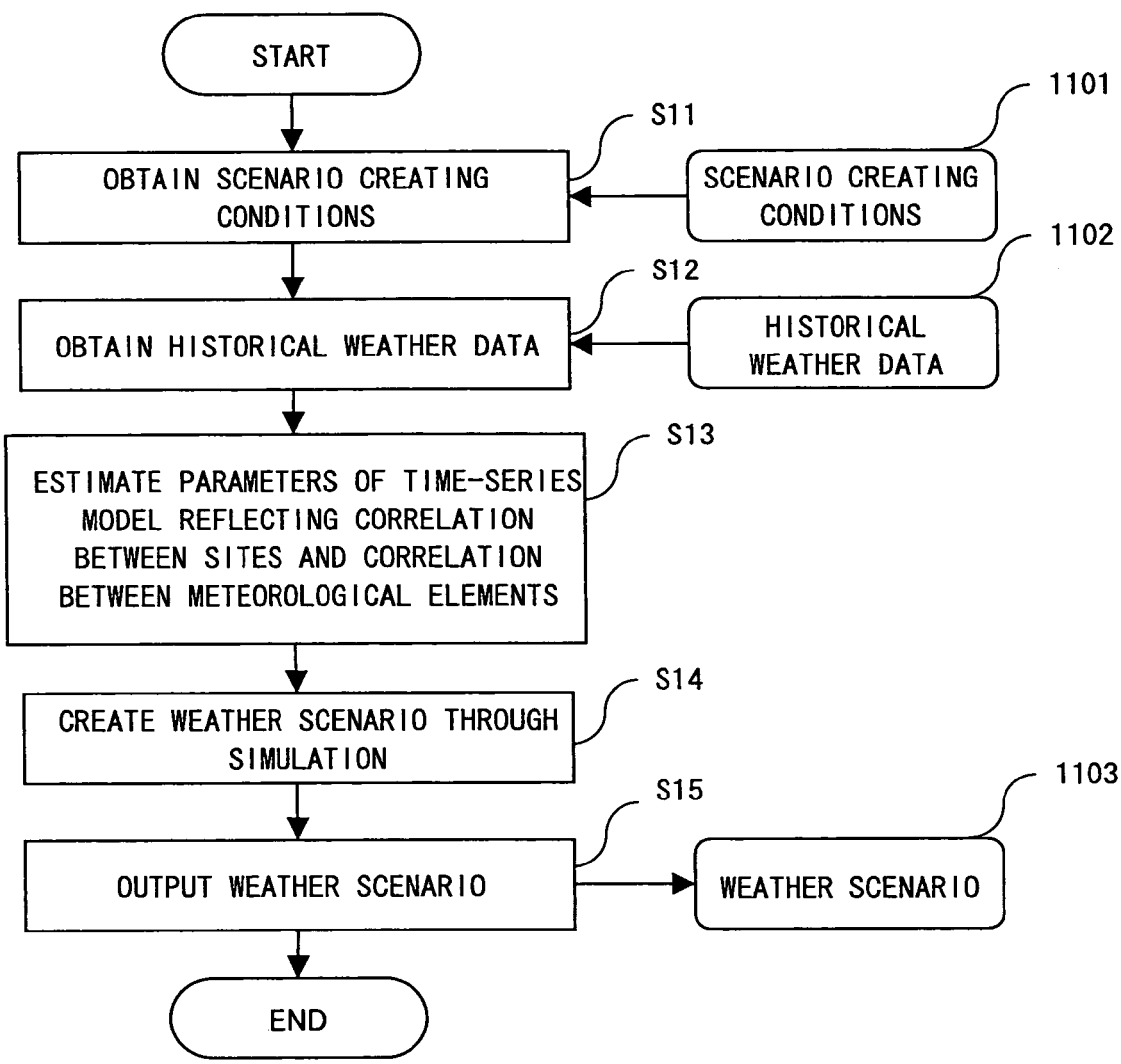
FIG. 2 is a flow chart of a weather scenario creating processing according to the embodiment of this invention.

FIG. 2 is a flow chart of weather scenario creating processing according to this embodiment. The weather scenario creating processing is executed by the weather scenario creating program 1172.

The weather scenario creating program 1172 first controls the display device 111 to display a message that prompts a user to input scenario creating conditions. Then the weather scenario creating program 1172 obtains the scenario creating conditions 1101 inputted by the user through the input devices 114 and 115 (Step S11). The weather scenario creating program 1172 then obtains the historical weather data 1102 necessary to create the weather scenario 1103 that accommodates the conditions inputted by the user (Step S12).

Thereafter, the weather scenario creating program 1172 estimates parameters of a time-series model which reflects a correlation between sites and a correlation between meteorological elements (Step S13), and creates as many weather scenarios as specified in the scenario creating conditions 1101 (Step S14).

The weather scenario 1103 created by weather simulation is outputted to the external storage device 117 (Step S15).

FIG. 3 is an explanatory diagram of the weather scenario creating conditions 1101.

The weather scenario creating conditions 1101 inputted by a user through the input devices 114 and 115 include a scenario creation number 21, a scenario creation period 22, and a scenario creation site 23.

FIG. 4 is an explanatory diagram of the historical weather data 1102.

The historical weather data 1102 is a record of weather data (temperature and precipitation) collected every day on plural sites for many years. Alternatively, the historical data 1102 may be weather data collected every hour instead of every day, or may include snowfall amount, wind velocity, wind direction and the like in addition to temperature and precipitation.

Although FIG. 4 shows only historical weather data of the period and site that correspond to the inputted weather scenario creating conditions 1101 (FIG. 3), the historical weather data 1102 can be a record of weather data of more periods and sites which is extracted as the weather scenario creating conditions 1101 demand.

Figure 5:
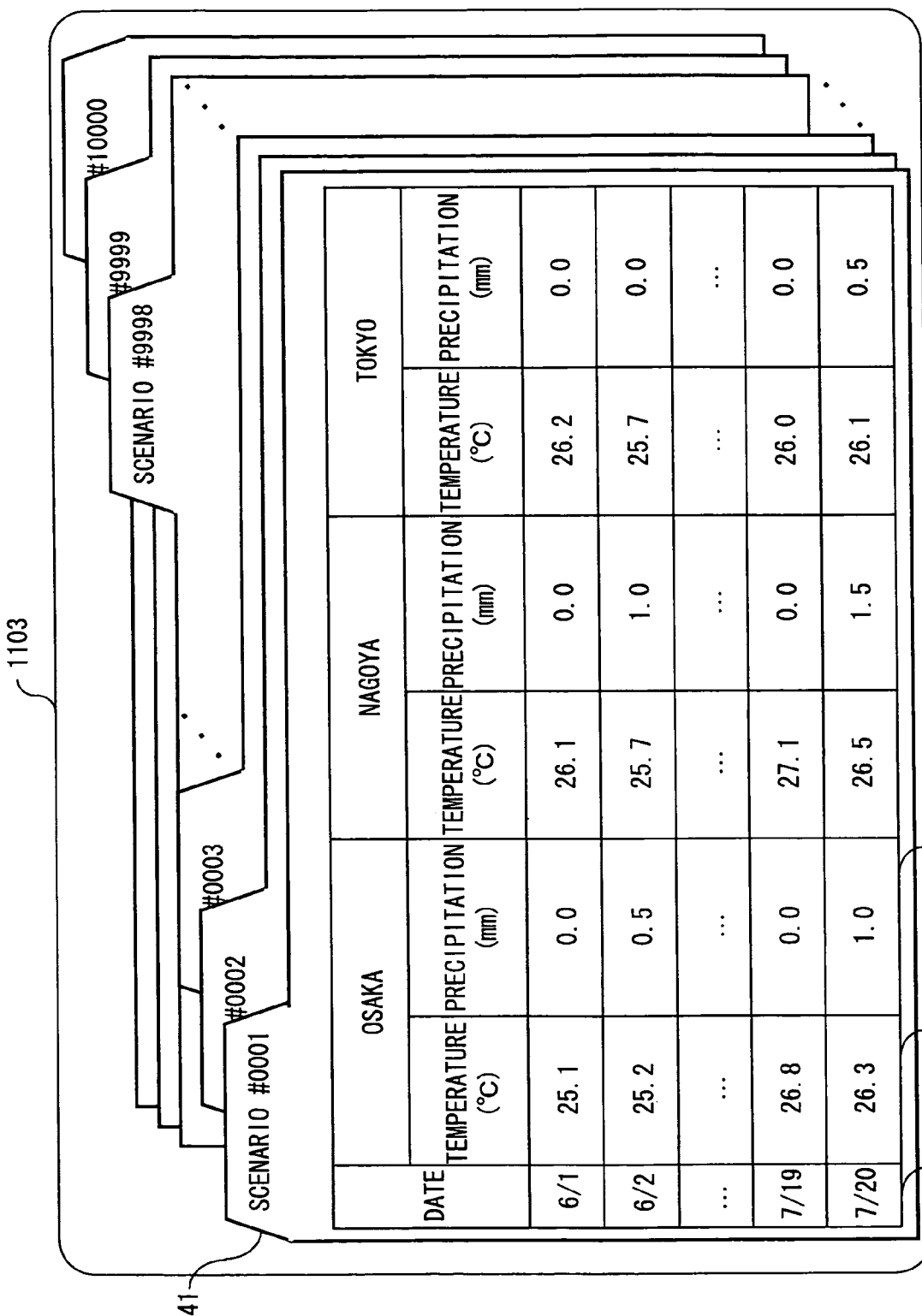
FIG. 5 is an explanatory diagram of a weather scenario according to the embodiment of this invention.

FIG. 5 is an explanatory diagram of the weather scenario 1103.

The weather scenario 1103 contains 10,000 weather scenarios (#0001 to #10000) created for the period (June 1 to July 20) and site (Osaka, Nagoya, and Tokyo) that correspond to the weather scenario creating conditions 1101 (FIG. 3).

Figure 6:
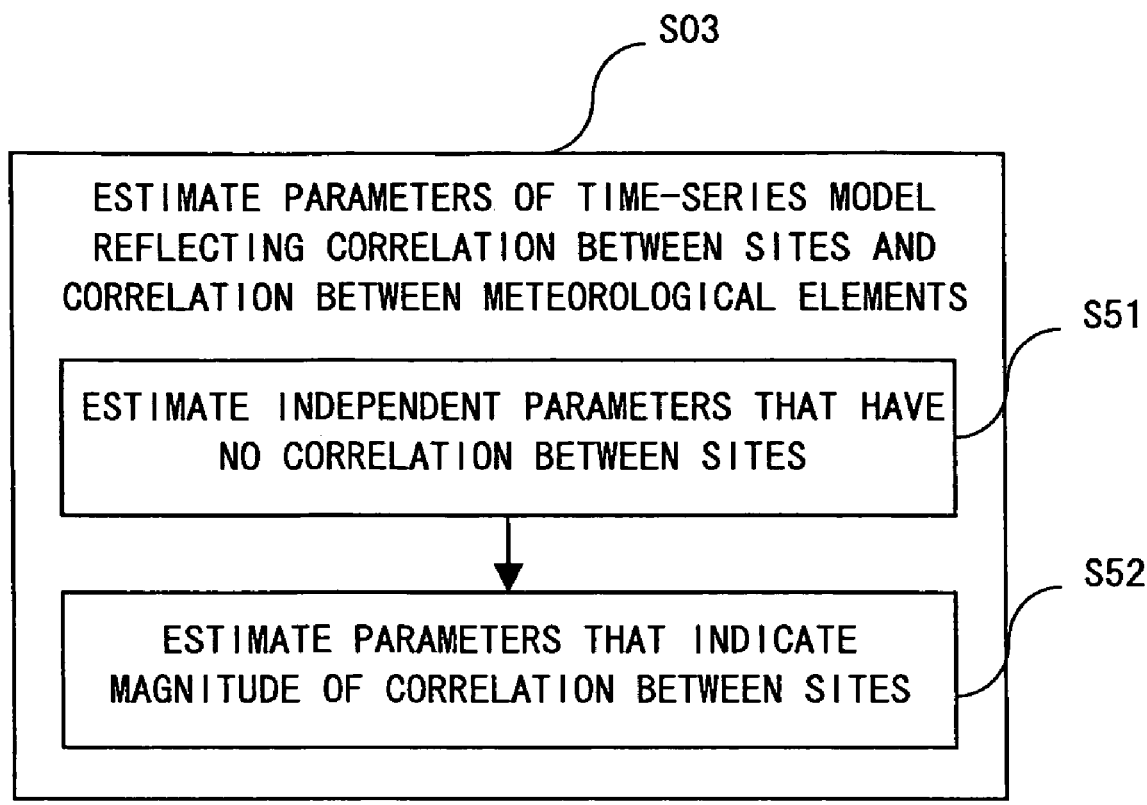
FIG. 6 is a flow chart showing details of parameter estimating processing according to the embodiment of this invention.

FIG. 6 is a flow chart showing details of the parameter estimating processing (Step S103 of FIG. 2).

Independent parameters, which do not have a correlation between sites, are estimated first (Step S51). Specifically, parameters $p_i$, $\mu_i$, $mi(0)(d)$, $\sigma i(0)(d)$, $mi(1)(d)$, and $\sigma i(1)(d)$ are estimated. These parameters are used in formulas (1) to (7), which are described later.

Next estimated are parameters that indicate the magnitude of the correlation between sites (Step S52). Specifically, parameters $\rho 0(i, j)$, $\rho 1(i, j)$, $\phi 0(i, j)$, and $\phi 1(i, j)$ are estimated. These parameters are used in formulas (8) to (13), which are described later.

Figure 7:
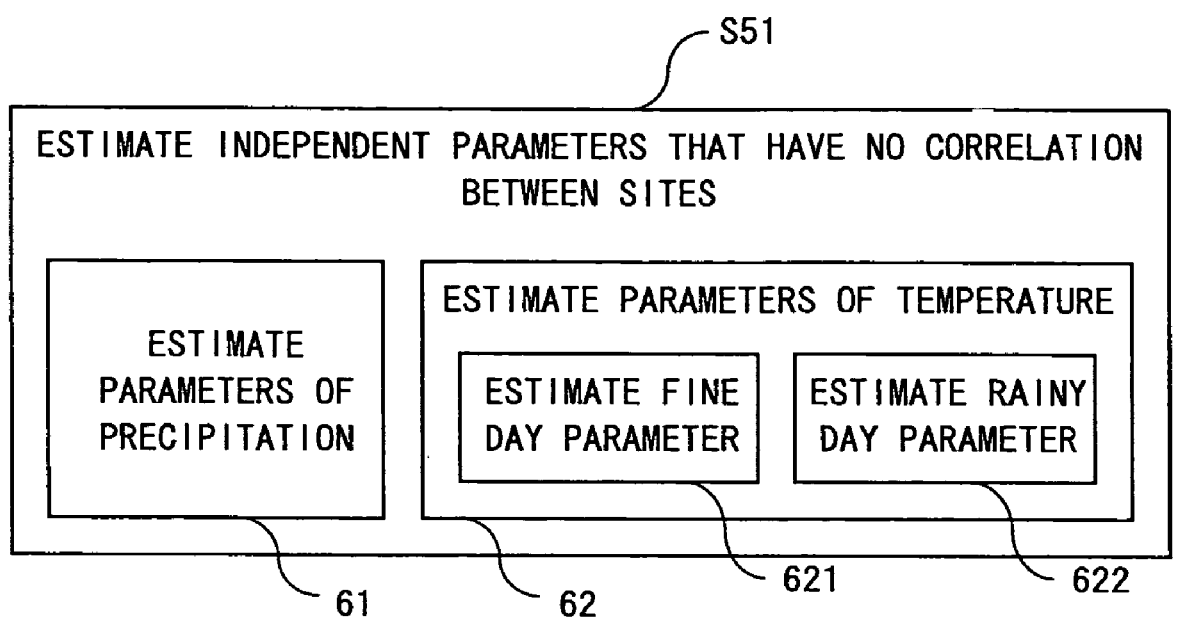
FIG. 7 is a conceptual diagram of processing of estimating independent parameters, which do not have a correlation between sites, according to the embodiment of this invention.

FIG. 7 is a conceptual diagram of the processing of estimating independent parameters which have no correlation between sites (Step S51 of FIG. 6).

The processing of estimating independent parameters which have no correlation between sites is made up of three parts. One is precipitation parameter estimating processing 61. The precipitation parameter estimating processing 61 is for estimating, from the precipitation historical data, parameters that characterize a fluctuation in precipitation on a site for which a weather scenario is created. Specifically, the parameters $p_i$ and $\mu_i$ which are used in formulas (1) and (3) described below are estimated.

The other two of the three parts are fine day temperature parameter estimating processing 621 and rainy day temperature parameter estimating processing 622 which are collectively referred to as temperature parameter estimating processing 62. The temperature parameter estimating processing 62 is for estimating, from the temperature historical data, parameters that characterize a fluctuation in temperature of a site for which a weather scenario is created. The use of different parameters for a fine day and a rainy day gives more accurate depiction of a temperature fluctuation since the temperature movement in clear weather and the temperature movement in wet weather differ from each other. Specifically, the parameters $mi(0)(d)$, $\sigma i(0)(d)$, $mi(1)(d)$, and $\sigma i(1)(d)$ which are used in formulas (2), (4) and (5) described below are estimated.

Figure 8:
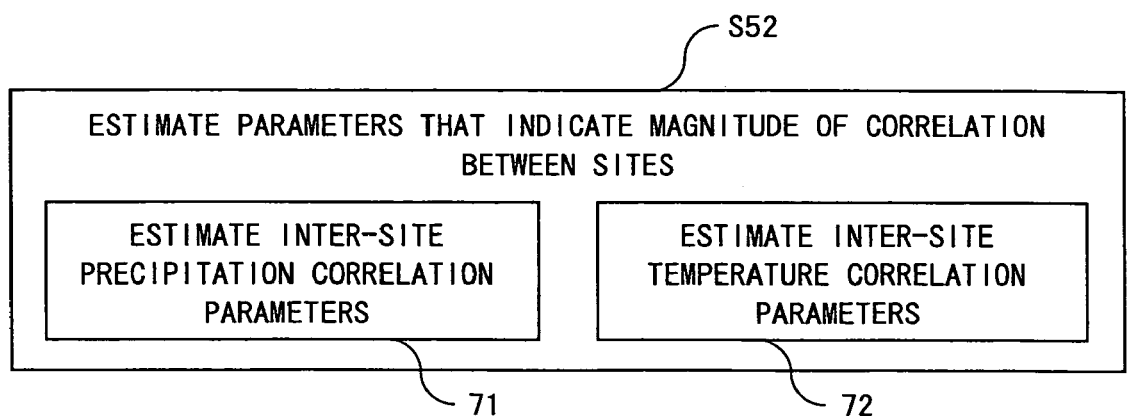
FIG. 8 is a conceptual diagram of processing of estimating parameters that indicate the magnitude of correlation between sites according to the embodiment of this invention.

FIG. 8 is a conceptual diagram of the processing of estimating parameters that indicate the magnitude of correlation between sites (Step S52 of FIG. 6).

The act of estimating parameters that indicate the magnitude of correlation between sites is made up of two parts, inter-site precipitation correlation parameter estimating processing 71 and inter-site temperature correlation parameter estimating processing 72.

Estimated in the inter-site precipitation correlation parameter estimating processing 71 are a parameter that characterizes the magnitude of correlation between the precipitation of a site i and the precipitation of a site j on the same day and a parameter that characterizes the magnitude of correlation between the precipitation of the site i and the precipitation of the site j on the previous day. Specifically, the parameters $\rho 0(i, j)$ and $\rho 1(i, j)$ which are used in formulas (8), (10), and (12) described below are estimated. The inter-site temperature correlation parameter estimating processing 72 calculates estimation of a parameter that characterizes the magnitude of correlation between the temperature of the site i and the temperature of the site j on the same day and a parameter that characterizes the magnitude of correlation between the temperature of the site i and the temperature of the site j on the previous day. Specifically, the parameters $\phi 0(i, j)$ and $\phi 1(i, j)$ which are used in formulas (9), (11), and (13) described below are estimated.

Figure 9:
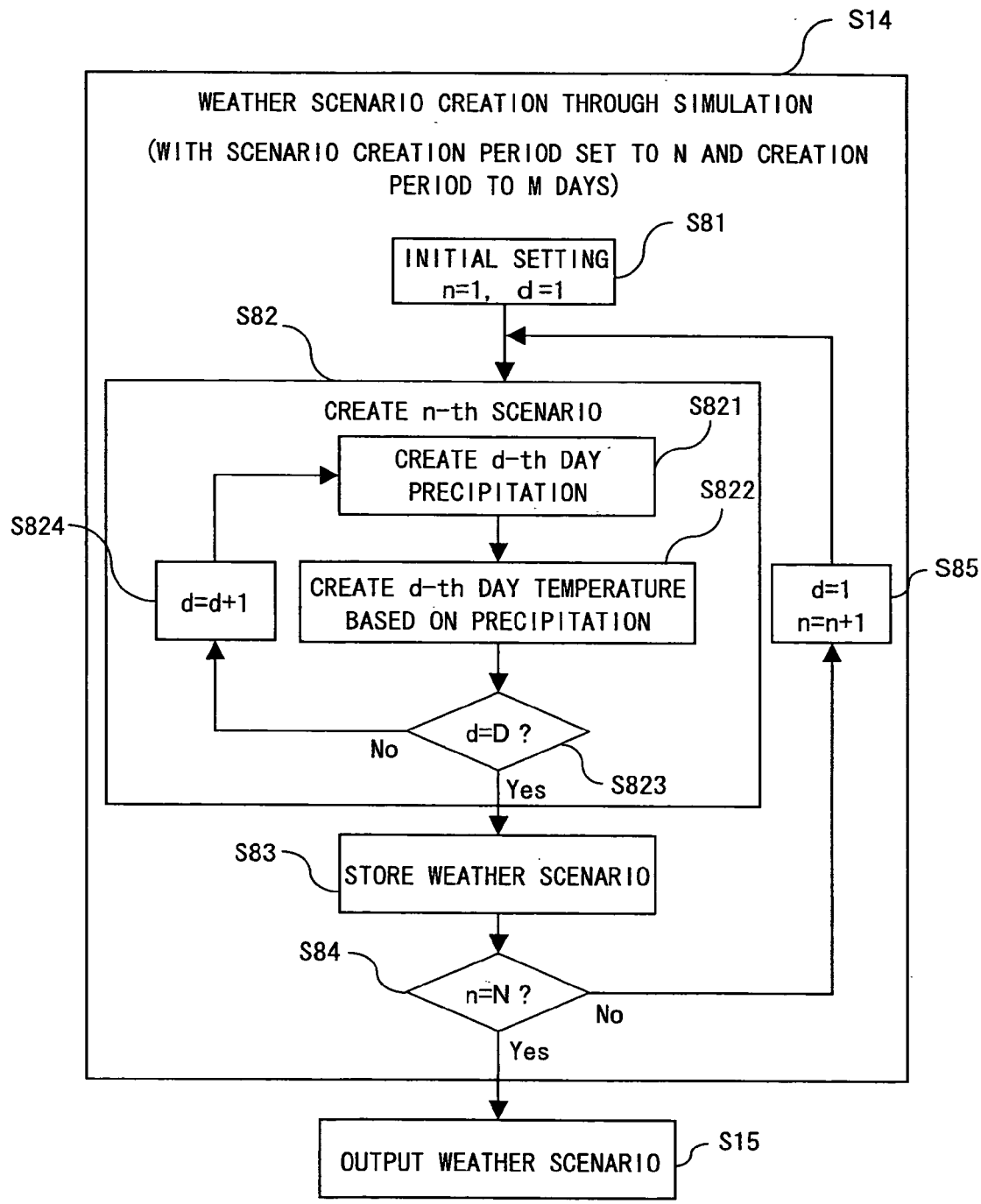
FIG. 9 is a flow chart showing details of weather scenario creation simulation processing according to the embodiment of this invention.

FIG. 9 is a flow chart showing details of the processing of creating a weather scenario by simulation (Step S14 of FIG. 2).

First, counters n and d are set to the initial value "1" (Step S81). The counter n is used to create a necessary number (a scenario creation number N) of weather scenarios. The counter d is used to create a weather scenario of a necessary period (D days).

The next processing is for creating an n-th weather scenario (Step S82). In the n-th weather scenario creating processing (Step S82), the precipitation on a d-th day is created first (Step S821) (if d=1, it is the first day and the weather scenario creating processing is conducted for the first time). Then the temperature on the d-th day is created with the use of precipitation correlation random numbers (Xi(d)) which have been used to create the precipitation (Step S822).

Then whether the counter d was equal to the necessary period D is judged (Step S823).

When d=D, it is judged that a weather scenario for the necessary period (for D days) has been completed and the processing goes to Step S83. On the other hand, when d≠D, it means that the weather scenario being created has not yet covered all of the necessary period (D days) specified. In this case, "1" is added to the counter d through an update and the process returns to Step S821 to create the precipitation for the (d+1)-th day.

In Step S83, the created weather scenario for D days is stored. Then whether the counter n was equal to the scenario creation number N is judged (Step S84).

When n=N, it is judged that as many weather scenarios as necessary, namely, N (scenario creation number) weather scenarios, have been created and the processing goes to Step S15. On the other hand, when n≠N, the count of weather scenarios created up to this point falls short of the necessary scenario number N. This calls for an update in which the counter d is set to "1" and "1" is added to the counter n. The process then returns to Step S82 to create the (n+1)-th weather scenario.

Figure 10:
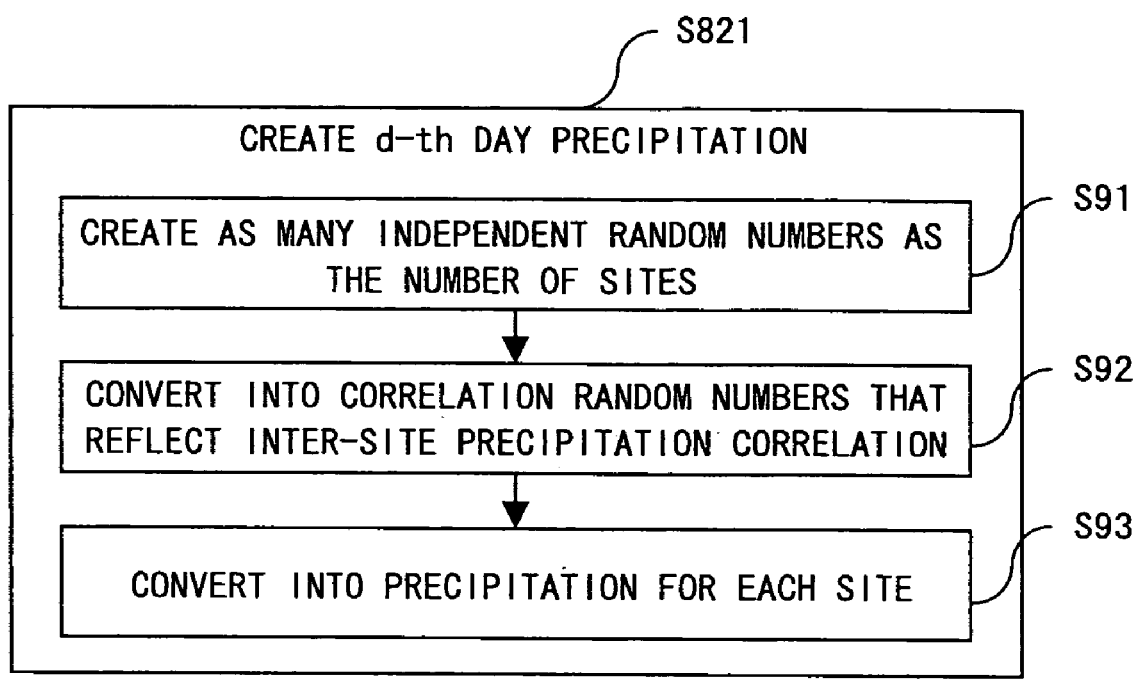
FIG. 10 is a flow chart showing details of d-th day precipitation creating processing according to the embodiment of this invention.

FIG. 10 is a flow chart showing details of the n-th day precipitation creating processing (Step S821 of FIG. 9).

The first step of the n-th day precipitation creating processing is to create as many independent random numbers as the number of sites (Step S91). The independent random numbers are converted into correlation random numbers which reflect the inter-site precipitation correlation (Step S92). The correlation random numbers are converted into precipitation for the respective sites (Step S93).

Specifically, stochastic variables ui are created which are independent of one another and which conform to the standard normal distribution (Step S91). Then the precipitation correlation random numbers Xi(d) are obtained from the constant ρ0(i, j), which indicates the magnitude of correlation between the precipitation of the site i and the precipitation of the site j on the same day, and the constant ρ1(i, j), which indicates the magnitude of correlation between the precipitation of the site i and the precipitation of the site j on the previous day, with the use of formulas (12), (10), (8), and (6) (Step S92). Then formula (1) is used to convert the precipitation correlation random numbers Xi(d) into precipitation ri(d) (Step S93).

Figure 11:
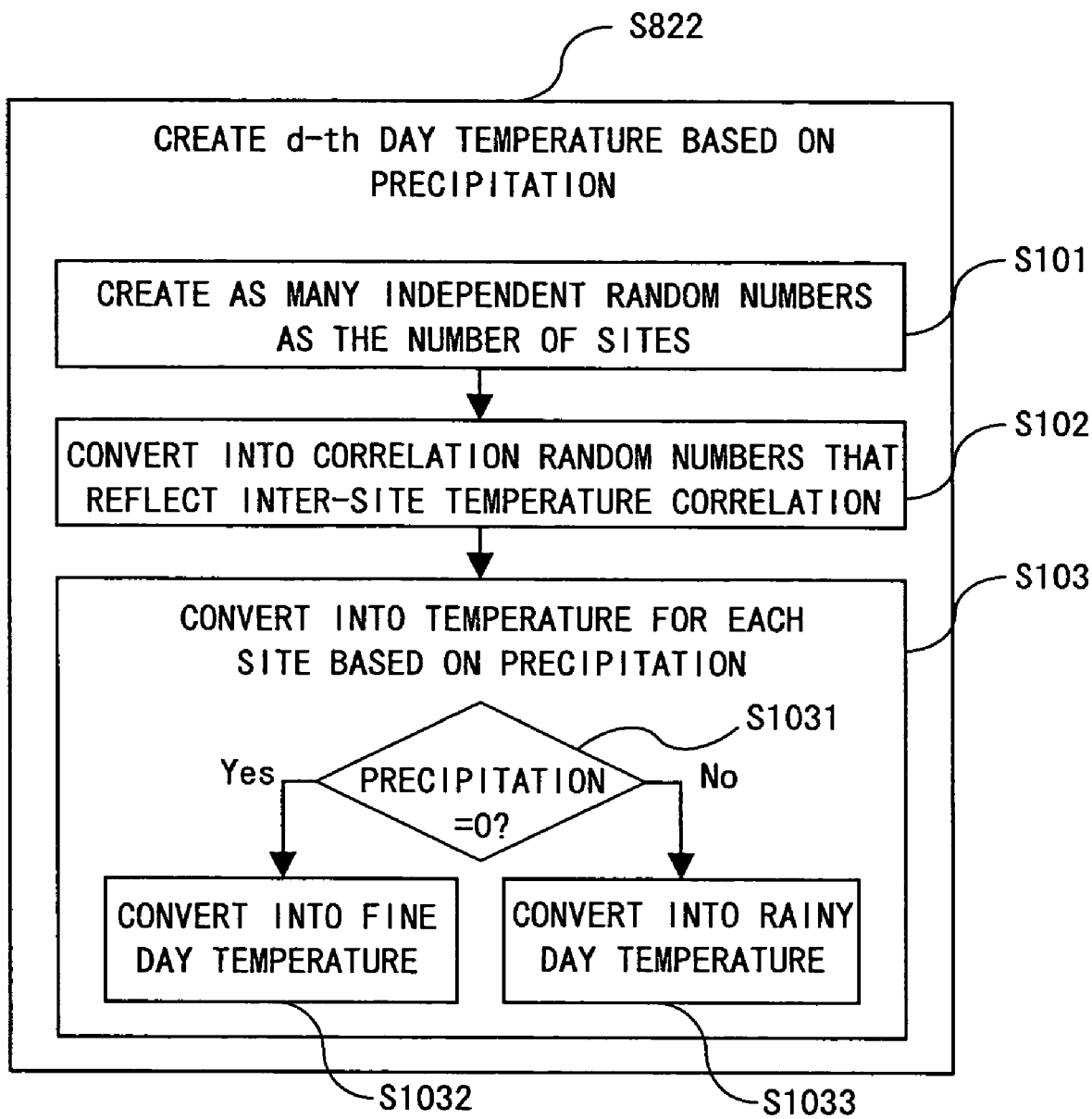
FIG. 11 is a flow chart showing details of d-th day temperature creating processing which utilizes the precipitation according to the embodiment of this invention.
Figure 12:
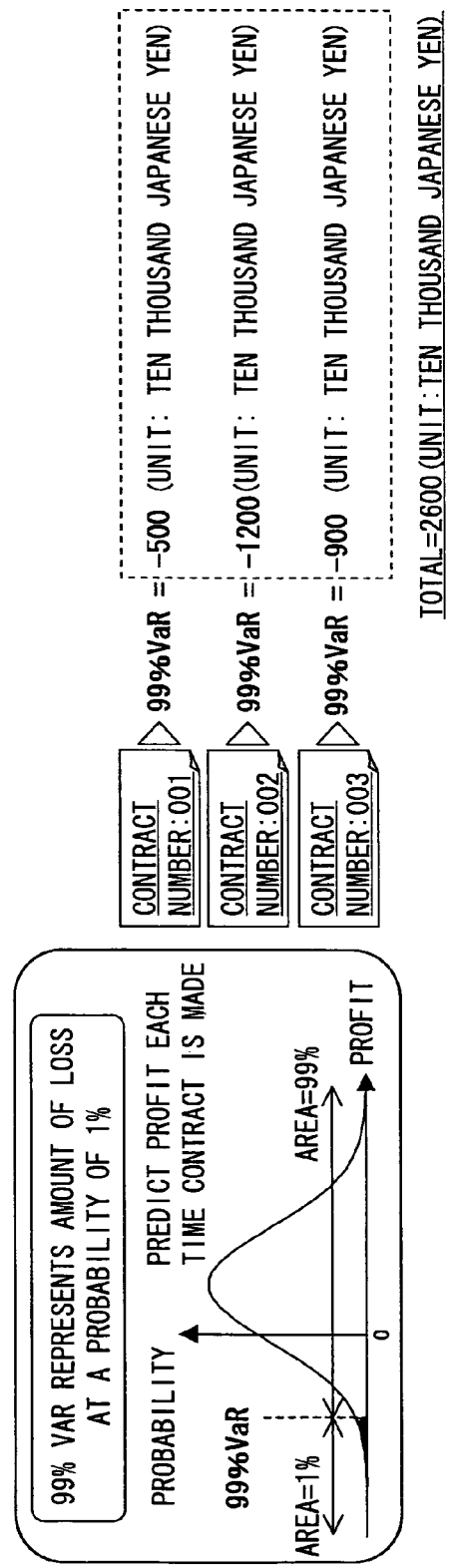
FIG. 12 is an explanatory diagram of VaR calculation.

FIG. 11 is a flow chart showing details of the processing of creating the temperature of the d-th day from the precipitation (Step S822 of FIG. 9).

The first step of the d-th day temperature creating processing is to create as many independent random numbers as the number of sites (Step S101). The independent random numbers are converted into correlation random numbers which reflect the inter-site temperature correlation (Step S102).

The correlation random numbers are converted into temperature for the respective sites based on the precipitation (Step S103). Here the precipitation is used by judging whether the precipitation is "0" or not (Step S1031). When the precipitation is "0", it is judged that the day in question is clear and the correlation random numbers are converted into a fine day temperature (Step S1032). When the precipitation is not "0", on the other hand, it is judged that the day in question is rainy and the correlation random numbers are converted into a rainy day temperature (Step S1033).

Specifically, stochastic variables vi are created which are independent of one another and which conform to the standard normal distribution (Step S101). Then inter-site temperature correlation random numbers Yi(d) are obtained from the constant φ0(i, j), which indicates the magnitude of correlation between the temperature of the site i and the temperature of the site j on the same day, and the constant φ1(i, j), which indicates the magnitude of correlation between the temperature of the site i and the temperature of the site j on the previous day, with the use of formulas (13), (11), (9), and (7) (Step S102). Then the precipitation correlation random numbers Xi(d) are used to judge whether the day in question is a fine day or a rainy day and to determine which conversion function Φ is to be employed in conversion to temperature (Step S1031). With the conversion function Φ specified and formula (2), the inter-site temperature correlation random numbers Yi(d) are converted into a temperature ti(d) (Steps S1032 and S1033).

A specific calculation method of the weather scenario creating processing described above will be explained next by presenting numerical formulas.

The precipitation and temperature on the d-th day on the site i are given as ri(d) mm and ti(d)° C., respectively. In this model, ri(d) is expressed by formula (1) and ti(d) is expressed by formula (2).

$$r_i(d) = \begin{cases} 0 & \text{for } X_i(d) \leq p_i \\ \Psi^{-1}(X_i(d), p_i) & \text{for } X_i(d) \geq p_i \end{cases} \quad (1)$$

$$t_i(d) = \begin{cases} \Phi_{(0)}^{-1}(Y_i(d)) & \text{for } X_i(d) \leq p_i \\ \Phi_{(1)}^{-1}(Y_i(d)) & \text{for } X_i(d) \geq p_i \end{cases} \quad (2)$$

In formulas (1) and (2), the symbol pi represents the probability of the weather being fine on the site i. Ψ−1 is a function for converting stochastic variables Xi(d) into precipitation and Φ−1 is a function for converting stochastic variables Yi(d) into temperature. Xi(d) and Yi(d) are stochastic variables ranging from 0 to 1.

Although there are various other functions that represent a temperature distribution and a precipitation distribution, the explanation below employs the inverse function of an exponential function for the precipitation and the inverse function of a normal distribution function for the temperature for the sake of simplification. A modification in function form does not affect in any way application of this invention.

$$X_i(d) = (1 - p_i) + p_i \int_0^{-\Psi} \frac{1}{\mu_i} \exp\left(-\frac{\xi}{\mu_i}\right) d\xi \quad (3)$$

$$Y_i(d) = \int_{-\infty}^{\Phi_{(0)}} \frac{1}{\sqrt{2\pi}\,\sigma_i^{(0)}(d)} \exp\left\{-\frac{(\xi - m_i^{(0)}(d))^2}{2(\sigma_i^{(0)}(d))^2}\right\} d\xi \quad (4)$$

$$Y_i(d) = \int_{-\infty}^{\Phi_{(1)}} \frac{1}{\sqrt{2\pi}\,\sigma_i^{(1)}(d)} \exp\left\{-\frac{(\xi - m_i^{(1)}(d))^2}{2(\sigma_i^{(1)}(d))^2}\right\} d\xi \quad (5)$$

In the formulas, μi represents the average precipitation in wet weather on the site i, the symbol mi(0)(d) represents the mean value of the temperature when the d-th day is a fine day, σi(0)(d) represents the standard deviation of the temperature when the d-th day is a fine day, mi(1)(d) represents the mean value of the temperature when the d-th day is a rainy day, and σi(1)(d) represents the standard deviation of the temperature when the d-th day is a rainy day.

In the formulas, Xi(d) and Yi(d) can be expressed as functions of stochastic variables xi(d) and yi(d), which conform to the standard normal distribution, by formulas (6) and (7), respectively.

$$X_i(d) = \int_{-\infty}^{x_i(d)} \frac{1}{\sqrt{2\pi}} \exp\left\{-\frac{\xi^2}{2}\right\} d\xi \quad (6)$$

$$Y_i(d) = \int_{-\infty}^{y_i(d)} \frac{1}{\sqrt{2\pi}} \exp\left\{-\frac{\xi^2}{2}\right\} d\xi \quad (7)$$

The stochastic variables xi(d) and yi(d) are expressed by the following multivariable autoregressive formulas:

$$\begin{pmatrix} x_1(d+1) \\ \vdots \\ x_m(d+1) \end{pmatrix} = A \begin{pmatrix} x_1(d) \\ \vdots \\ x_m(d) \end{pmatrix} + B \begin{pmatrix} u_1(d) \\ \vdots \\ u_m(d) \end{pmatrix} \quad (8)$$

$$\begin{pmatrix} y_1(d+1) \\ \vdots \\ y_m(d+1) \end{pmatrix} = C \begin{pmatrix} y_1(d) \\ \vdots \\ y_m(d) \end{pmatrix} + D \begin{pmatrix} v_1(d) \\ \vdots \\ v_m(d) \end{pmatrix} \quad (9)$$

In the expressions, ui(d) and vi(d) are each stochastic variables which are independent of one another and which conform to the standard normal distribution. Constant matrices A, B, C, and D, which take into account the inter-site correlation, are defined as follows:

$$A = G_1 G_0^{-1}$$

$$BB^t = G_0 - G_1 G_0^{-1} G_1^t \quad (10)$$

Expression 11

$$C = H_1 H_0^{-1}$$

$$DD^t = H_0 - H_1 H_0^{-1} H_1^t \quad (11)$$

G0, G1, H0, and H1 in formulas (10) and (11) are defined as follows:

$$G_0 = \begin{pmatrix} \rho_0(1,1) & \cdots & \rho_0(1,M) \\ \vdots & \ddots & \vdots \\ \rho_0(M,1) & \cdots & \rho_0(M,M) \end{pmatrix}, \quad (12)$$

$$G_1 = \begin{pmatrix} \rho_1(1,1) & \cdots & \rho_1(1,M) \\ \vdots & \ddots & \vdots \\ \rho_1(M,1) & \cdots & \rho_1(M,M) \end{pmatrix}$$

$$H_0 = \begin{pmatrix} \varphi_0(1,1) & \cdots & \varphi_0(1,M) \\ \vdots & \ddots & \vdots \\ \varphi_0(M,1) & \cdots & \varphi_0(M,M) \end{pmatrix}, \quad (13)$$

-continued $$H_1 = \begin{pmatrix} \varphi_1(1,1) & \cdots & \varphi_1(1,M) \\ \vdots & \ddots & \vdots \\ \varphi_1(M,1) & \cdots & \varphi_1(M,M) \end{pmatrix}$$

wherein G0 and G1 are matrices that represent the inter-site precipitation correlation. In the formulas, ρ0(i, j) is a constant that indicates the magnitude of correlation between the precipitation of the site i and the precipitation of the site j on the same day. And ρ1(i, j) is a constant that indicates the magnitude of correlation between the precipitation of the site i on one day and the precipitation of the site j on the previous day. Also, H0 and H1 are matrices that represent the inter-site temperature correlation. In the formulas, φ0(i, j) is a constant that indicates the magnitude of correlation between the temperature of the site i and the temperature of the site j on the same day. And φ1(i, j) is a constant that indicates the magnitude of correlation between the temperature of the site i on one day and the temperature of the site j on the previous day.

As described above, weather model of this embodiment has the independent parameters pi, μi, mi(0)(d), σi(0)(d), mi(1)(d), and σi(1)(d) which do not have a correlation between sites, and the parameters ρ0(i, j), ρ1(i, j), φ0(i, j), and φ1(i, j) which indicate the magnitude of correlation between sites. These parameters are statistically estimated from the historical weather data.

Described next is the procedure of creating a weather scenario using the calculation method explained above.

First, random numbers ui(d) (i=1, . . . , D) and vi(d) (i=1, . . . , D) are created which are independent of one another and which conform to the standard normal distribution. The random numbers ui(d) and vi(d) are converted into xi(d) and yi(d) by formulas (8) and (9), respectively. Then xi(d) and yi(d) are converted into Xi(d) and Yi(d) by formulas (6) and (7), respectively. Lastly, formula (1) is used to convert Xi(d) into precipitation and formula (2) is used to convert Yi(d) to temperature. The conversion to temperature also uses Xi(d).

As described above, in this embodiment, many (M) random numbers ui as the number of sites for which weather scenarios are to be created. The created random numbers ui are converted to the random numbers Xi(d) which reflect the inter-site precipitation correlation. Then the converted random numbers Xi(d) are converted to the precipitation ri(d). Many (M) random numbers vi as the number of sites for which weather scenarios are to be created. The created random numbers vi are converted to the random numbers Yi(d) which reflect the inter-site temperature correlation. Then the converted random numbers Yi(d) are converted to the temperature ti(d) with the function Φ. the function Φ is chosen based on the random numbers Xi(d) which reflect the inter-site precipitation correlation. Thus the embodiment can create a weather scenario in which the correlation between sites and the correlation between meteorological elements. Therefore the embodiment is capable of predicting the risk with accuracy.

It is mathematically very difficult to combine consistently the multi-site temperature model, multi-site precipitation model ((Rodrigo Caballero et al. and D. S. Wilks), and single-site precipitation-temperature correlation model (Richardson, C. W.) of the related art. Instead of using an unprocessed precipitation or temperature value, this invention factors in a correlation between meteorological elements at the stage of stochastic variables, which is the preliminary stage of precipitation or temperature. This invention is therefore capable of providing a weather forecast in which the correlation between precipitation and temperature, the inter-site precipitation correlation, and the inter-site temperature correlation are all consistent with one another.

While the present invention has been described in detail and pictorially in the accompanying drawings, the present invention is not limited to such detail but covers various obvious modifications and equivalent arrangements, which fall within the purview of the appended claims.

What is claimed is:

1. A method of predicting weather on a computer by creating a weather scenario from historical weather data, comprising:
    a first step of estimating parameters of a weather time-series model based on historical weather data including past plural meteorological elements, a meteorological element correlation between sites, and a correlation between meteorological elements; and
    a second step of converting random numbers into meteorological elements based on the estimated parameters
    wherein the first step comprises:
    a third step of estimating a precipitation parameter based on historical precipitation data and a precipitation correlation between sites, and
    a fourth step of estimating a temperature parameter based on historical temperature data, a temperature correlation between sites, and a correlation between temperature and precipitation
    wherein the parameters include:
    first parameter describing statistical characteristics of precipitations on each site,
    second parameter describing statistical characteristics of temperature on each site,
    third parameter describing correlations between temperature and precipitations on each site,
    fourth parameter describing correlations between temperatures on each pair of sites, and
    fifth parameter describing correlations between precipitations on each pair of sites,
    wherein the method creates a plurality of weather scenarios by executing the second step predetermined times, and
    outputting the weather scenarios that are created.

2. The prediction method according to claim 1,
    wherein the second step comprises:
    a fifth step of creating as many independent random numbers as the number of sites for which weather scenarios are to be created, and
    a sixth step of converting the created independent random numbers to precipitation correlation random numbers relating to a precipitation correlation between sites,
    a seventh step of creating as many independent random numbers as the number of sites for which weather scenarios are to be created,
    an eighth step of converting the created independent random numbers into temperature correlation random numbers relating to a temperature correlation between sites, and
    a ninth step of selecting from different conversion parameters based on the created precipitation correlation random numbers,
    wherein the second step converts the precipitation correlation random numbers to precipitation and converts the temperature correlation random numbers into temperature by using the selected conversion parameters.

3. The prediction method according to claim 2,
    wherein the sixth step converts the created independent random numbers into the precipitation correlation random numbers based on a correlation between the precipitation of one site and the precipitation of another site in the same period and a correlation between the precipitation of the one site and the precipitation of the other site in the preceding period, and
    wherein the eighth step converts the created independent random numbers into the temperature correlation random numbers based on a correlation between the temperature of one site and the temperature of another site in the same period and a correlation between the temperature of the one site and the temperature of the other site in the preceding period.

4. The prediction method according to claim 1, wherein the weather scenarios created are used to calculate expected weather risks.

5. A prediction system with computing unit and storing unit, to predict weather by creating a weather scenario based on historical weather data, comprising:
    parameter estimating module that estimates parameters of a weather time-series model based on historical weather data including past plural meteorological elements stored in the storing unit, a meteorological element correlation between sites and a correlation between meteorological elements; and
    meteorological element converting module that converts random numbers into meteorological elements based on the estimated parameters,
    wherein the meteorological element converting module comprises:
    a first random number creating module that creates as many independent random numbers as the number of sites for which weather scenarios are to be created;
    a first correlation random number converting module that converts the independent random numbers created by the first random number creating module to precipitation correlation random numbers based on a correlation between the precipitation of one site and the precipitation of another site in the same period and a correlation between the precipitation of the one site and the precipitation of the other site in the preceding period;
    a second random number creating module that creates as many independent random numbers as the number of sites for which weather scenarios are to be created;
    a second correlation random number converting module that converts the independent random numbers created by the second random number creating means to temperature correlation random numbers based on a correlation between the temperature of one site and the temperature of another site in the same period and a correlation between the temperature of the one site and the temperature of the other site in the preceding period; and
    temperature parameter selecting module that selects from different conversion parameters based on the created precipitation correlation random numbers,
    wherein the meteorological element converting module comprises:
    precipitation converting module that converts the precipitation correlation random numbers to precipitation; and
    temperature converting module that converts the temperature correlation random numbers into temperature by using the selected conversion parameter, wherein the meteorological element converting module creates a plurality of weather scenarios by calculating predetermined times.

6. A computer program embodied on a computer-readable medium for controlling a computer to predict weather by creating a weather scenario based on historical weather data, the program controlling the computer to:

estimate parameters of a weather time-series model based on historical weather data including past plural meteorological elements stored in a storing unit, a meteorological element correlation between sites, and a correlation between meteorological elements; and convert random numbers to meteorological elements based on the estimated parameters, wherein the parameter estimating includes:

estimating a precipitation parameter based on historical precipitation data and a precipitation correlation between sites, and estimating a temperature parameter based on historical temperature data, a temperature correlation between sites, and a correlation between temperature and precipitation, wherein the parameters include:

first parameter describing statistical characteristics of precipitations on each site, second parameter describing statistical characteristics of temperature on each site, third parameter describing correlations between temperature and precipitations on each site, fourth parameter describing correlations between temperatures on each pair of sites, and fifth parameter describing correlations between precipitations on each pair of sites, and wherein the program controlling the computer creates a plurality of weather scenarios by executing the converting of random numbers predetermined times, and output the weather scenario that is created.

7. The computer program embodied on a computer-readable medium according to claim 6, wherein the converting of random numbers includes:

creating as many independent random numbers as the number of sites for which weather scenarios are to be created, converting the created independent random numbers to precipitation correlation random numbers relating to a precipitation correlation between sites, creating as many independent random numbers as the number of sites for which weather scenarios are to be created, converting the created independent random numbers to temperature correlation random numbers relating to a temperature correlation between sites, and selecting from different conversion parameters based on the created precipitation correlation random numbers, and wherein the program controls the computer to convert the precipitation correlation random numbers to precipitation and the temperature correlation random numbers into temperature by using the selected conversion parameters.

8. The computer program embodied on a computer-readable medium according to claim 7, wherein converting to precipitation correlation random numbers converts the created independent random numbers into the precipitation correlation random numbers based on a correlation between the precipitation of one site and the precipitation of another site in the same period and a correlation between the precipitation of the one site and the precipitation of the other site in the preceding period, wherein converting to temperature correlation random numbers converts the created independent random numbers to the temperature correlation random numbers based on a correlation between the temperature of one site and the temperature of another site in the same period and a correlation between the temperature of the one site and the temperature of the other site in the preceding period.

9. The computer program embodied on a computer-readable medium according to claim 8, wherein the weather scenarios created are used to calculate expected weather risks.

10. A computer system for predicting weather by creating a weather scenario from historical weather data, comprising: a CPU which performs a program to execute processing and storage device storing data used in the processing, wherein the CPU is configured for:

estimating parameters of a weather time-series model based on historical weather data including past plural meteorological elements, a meteorological element correlation between sites, and a correlation between meteorological elements; and converting random numbers into meteorological elements based on the estimated parameters, wherein the parameter estimating includes:

estimating a precipitation parameter based on historical precipitation data and a precipitation correlation between sites, and estimating a temperature parameter based on historical temperature data, a temperature correlation between sites, and a correlation between temperature and precipitation, wherein the parameters include:

first parameter describing statistical characteristics of precipitations on each site, second parameter describing statistical characteristics of temperature on each site, third parameter describing correlations between temperature and precipitations on each site, fourth parameter describing correlations between temperatures on each pair of sites, fifth parameter describing correlations between precipitations on each pair of sites, and wherein the computer system creates a plurality of weather scenarios by executing the step of converting random numbers predetermined times.

* * * * *